United States Patent [19]

Hale

[11] Patent Number: 4,475,851

[45] Date of Patent: Oct. 9, 1984

[54] INSERTS FOR CUTTING TOOLS

[75] Inventor: Alan A. Hale, Berkhamsted, England

[73] Assignee: General Electric Company, Detroit, Mich.

[21] Appl. No.: 449,066

[22] Filed: Dec. 13, 1982

[30] Foreign Application Priority Data

Feb. 26, 1982 [GB] United Kingdom ............... 8205690

[51] Int. Cl.³ .................... B23P 15/28; B26D 1/00; B26D 3/00
[52] U.S. Cl. .................................. 407/113; 407/114
[58] Field of Search ............................ 407/113, 114

[56] References Cited

U.S. PATENT DOCUMENTS

| | | | |
|---|---|---|---|
| 3,187,406 | 6/1965 | Franko | 407/114 |
| 3,271,842 | 9/1966 | Breuning | 407/103 X |
| 3,381,349 | 5/1968 | Newcomer | 407/101 X |
| 3,481,015 | 12/1969 | Bogner | 407/113 |
| 3,802,041 | 4/1974 | Swann | 407/113 |
| 3,878,905 | 4/1975 | Schaumann | 408/713 |
| 3,975,809 | 8/1976 | Sorice et al. | 407/114 |
| 4,105,357 | 8/1978 | Kehl | 408/188 X |
| 4,149,821 | 4/1979 | Faber | 408/705 X |
| 4,215,957 | 7/1980 | Holma et al. | 407/114 |
| 4,230,429 | 10/1980 | Eckle | 408/186 |
| 4,268,198 | 5/1981 | Peters | 408/713 X |
| 4,359,300 | 11/1982 | Hazra et al. | 407/114 |

FOREIGN PATENT DOCUMENTS

| | | | |
|---|---|---|---|
| 2161286 | 6/1973 | Fed. Rep. of Germany | 402/111 |
| 41-456904 | 10/1966 | Japan | 407/42 |
| 1359238 | 7/1974 | United Kingdom | 407/114 |

Primary Examiner—Leonidas Vlachos
Assistant Examiner—William Terrell
Attorney, Agent, or Firm—J. J. Lichiello; E. F. Chapman

[57] ABSTRACT

An indexable disposable insert is described having eight contiguous edge faces of equal length and two octagonal side faces having alternate corners with equal obtuse angles, cutting edges being formed at the junction of at least one of the octagonal side faces and each of the eight contiguous edge faces. Four identical pairs of cutting edges of equal length arranged about an obtuse angle are provided. The obtuse angles which may vary in the range 135° to 170° but are preferably 160°. The insert can have chip breakers applied to it.

7 Claims, 4 Drawing Figures

INSERTS FOR CUTTING TOOLS

CROSS REFERENCE TO RELATED PATENT APPLICATION

This patent application is related to Applicant's copending U.S. patent application Ser. No. 423,500 filed Dec. 27, 1982 also assigned to the instant assignee.

The invention is concerned with disposable inserts which can be used for turning, boring and milling. In particular, the invention relates to indexable inserts of octagonal shape. The insert may have various different chip breaker forms.

Disposable indexable inserts are used in many machine tools. They are generally detachably secured to a holder to be used for cutting etc. When the cutting edge is worn during operation they can be removed from the holder, turned such that a new cutting edge is presented to the workpiece and once again secured to the holder. When all the cutting edges have been used, the insert is replaced.

Hexagonal shaped inserts are used in various machine tools such as turning, tools, drilling and grooving tools. A known type of hexagonal shaped insert has alternate acute and obtuse angled corners. When a hexagonally shaped insert of this type is used, the two cutting edges making up the obtuse angle are generally applied to the workpiece. An example of a hexagonally shaped insert is shown in U.K. Pat. No. 1,359,238.

Hexagonal shaped inserts of the above type can be used in drilling tools. An example of such a use is shown in U.K. patent application No. 2000704A. In this arrangement, cutting bits are arranged in a recess at the end of a drill shank. The hexagonal cutting insert has six cutting edges of equal length of which two are in engagement with the workpiece at each time. The two operative cutting edges are those cutting edges which make up one of the obtuse angles of the hexagonal insert. To improve the cutting of the borer, the operative cutting edges each form approximately the same angle to a line parallel to the turning axis of the drill. The working region of the operative cutting edges of each of the inserts overlap as the drill turns so that material is removed from the bore being cut.

One of the problems with the above type of insert is that the geometry of the insert determines that alternate corners are acute and obtuse. The acute angled corner is susceptible to breakage, particularly when used as a drill bit.

The present invention provides an indexable disposable insert having eight contiguous edge faces of equal length and two octagonal side faces having alternate corners with equal obtuse angles, cutting edges being formed at the junction of at least one of the octagonal side faces and each of the eight contiguous edge faces.

The essential feature of the present invention is that alternate corners of the octagonal side faces should have equal obtuse angles. This provides four identical pairs of cutting edges of equal length each arranged about an obtuse angle. The indexable inserts of the present invention have obtuse angles which may vary in the range 135° to 170°. The most useful obtuse angles for the insert are in the range 150° to 165°, preferably 160°.

It is possible that all the angles of the octagonal side faces may be equal i.e. 135° making the octagonal side faces regular in shape. The preferred arrangement is for an indexable disposable insert having eight contiguous edge faces of equal length and two octagonal side faces having alternate corners with equal obtuse angles, the opposing pairs of angles of the octagonal side faces being equal. The preferred arrangement has four opposing equal obtuse angles forming the alternate corners with equal obtuse angles; two opposing obtuse angles of a first value, which may approximate a right angle and two opposing obtuse angles of a second value greater than that of the first value. Specifically an example of the insert of the present invention has four opposing obtuse angles of 160°, two opposing angles of 95° and two opposing angles of 125°. All the angles may have tolerances of ±30'. In a preferred insert, two of the angles, apart from the four equal obtuse angles, may be in the range of greater than 90° but less than 100°.

The insert of the present invention is generally provided with chip breakers behind the cutting edges to enable the material being cut to be removed. The chip breaker may be a groove of any well known cross-section for inserts. Thus, the profile may vary. One example is a single groove behind the cutting edge having a first radius of curvature extending from the cutting edge or a land behind the cutting edge to the lowest point of the groove and a second radius of curvature extending from the lowest point of the groove to the surface of the octagonal side face. Another type of groove may be a single curved groove. A third type may be a double curved groove and a fourth type may be a flat bottom groove having sloping sides.

The chip breaker behind each alternate cutting edge can have a taper of up to 12° preferably in the range of 2° and 10° from the parallel, more preferably about 5°. The chip breaker width behind adjacent cutting edges along a notional line dividing the obtuse angle is generally but not necessarily the same width. However, the width increases uniformly on one side of the notional line, to form the taper until the chip breaker reaches the acute angled corner of the insert.

Instead of a groove, the chip breaker may be a series of spaced apart dimples behind the cutting edge of the insert. The dimples may be in the form of, for example, small circular depressions or indentations in the octagonal face uniformly spaced from one another. They may also be uniformly spaced from the cutting edge. The depressions may be similar in size or may increase in size such that they form a tapered chip breaking groove behind each alternate cutting edge.

The inserts of this invention are generally of the positive rake type i.e. the angle between the contiguous edge faces and the octagonal side faces forming the cutting edge is an acute angle. The angle may be up to 12° between 5° and 12°, less than 90°, this being referred to as the rake angle. The rake used on inserts of the present invention is preferably 7° although this may be any value in the above range. For a positive rake insert, the cutting edges are formed at the junctions of the contiguous edge faces and only one of the octagonal side faces.

The insert may also be a negative rake insert. The angle between the contiguous edge faces and the octagonal side faces may be 90°. In this case, cutting edges are formed at the junction of the contiguous edge faces and each of the octagonal side faces, making the insert indexable and also reversible.

The insert may be attached to the tool by known means such as by a screw, lock pin or a clamp as in known in the art.

The present invention will be further described, by way of example only, with reference to the accompanying drawings, in which.

Figure 1:
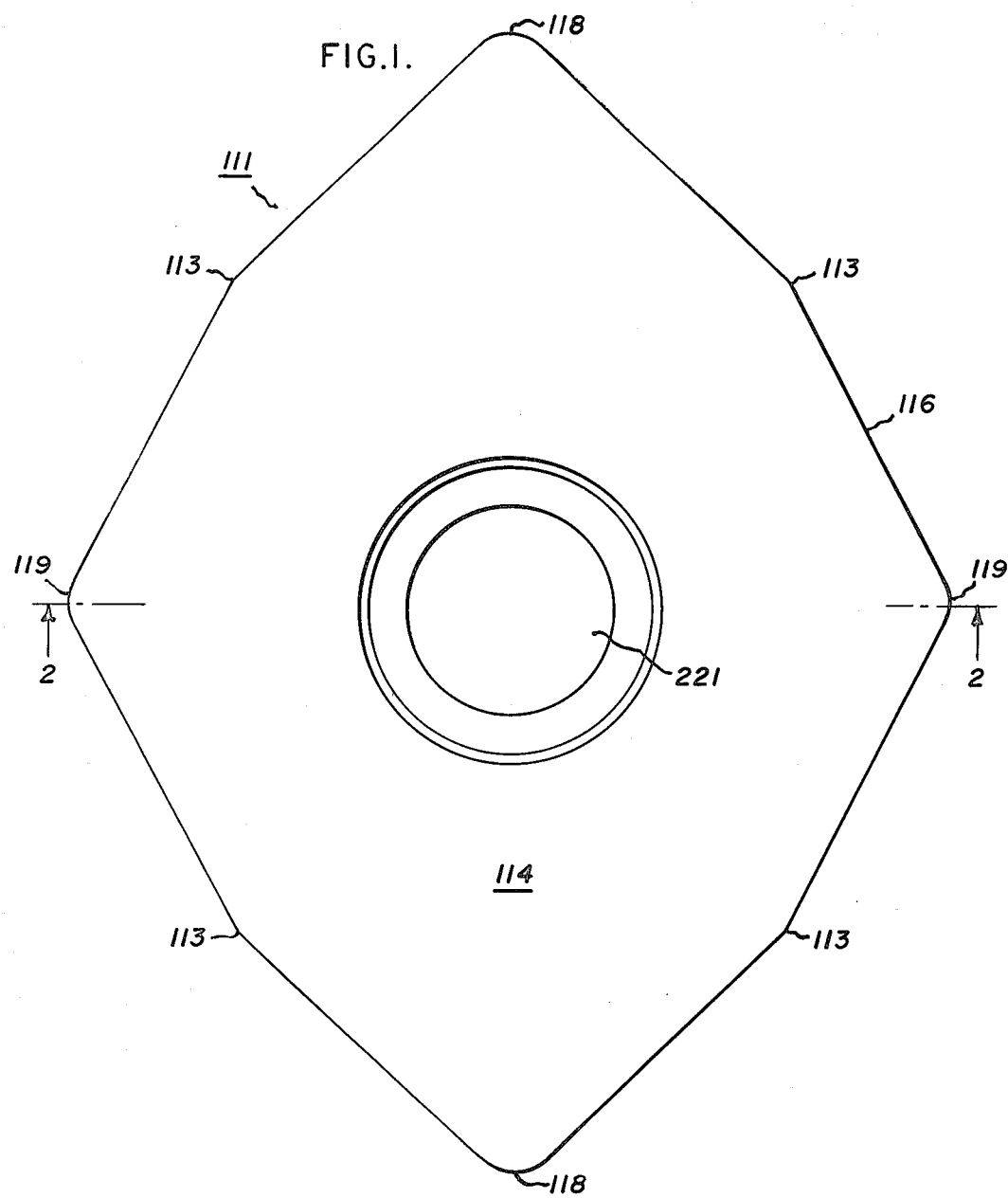
FIG. 1 is a plan view of a octagonal insert of the present invention.
Figure 2:
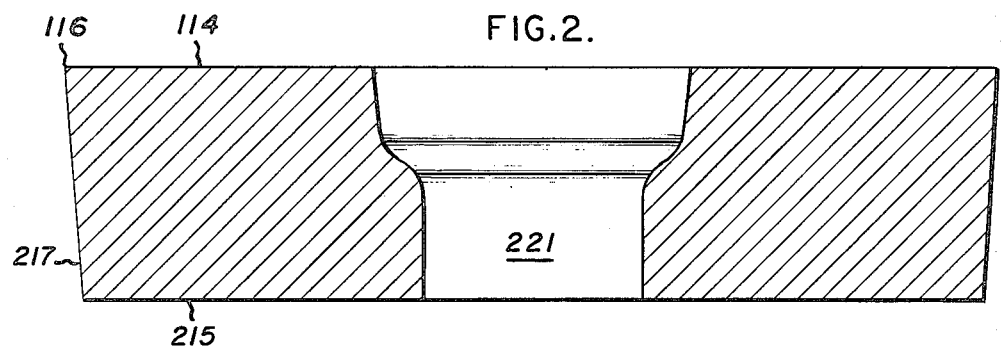
FIG. 2 is a cross-section of the insert taken along the line 2—2 as FIG. 1.
Figure 4:
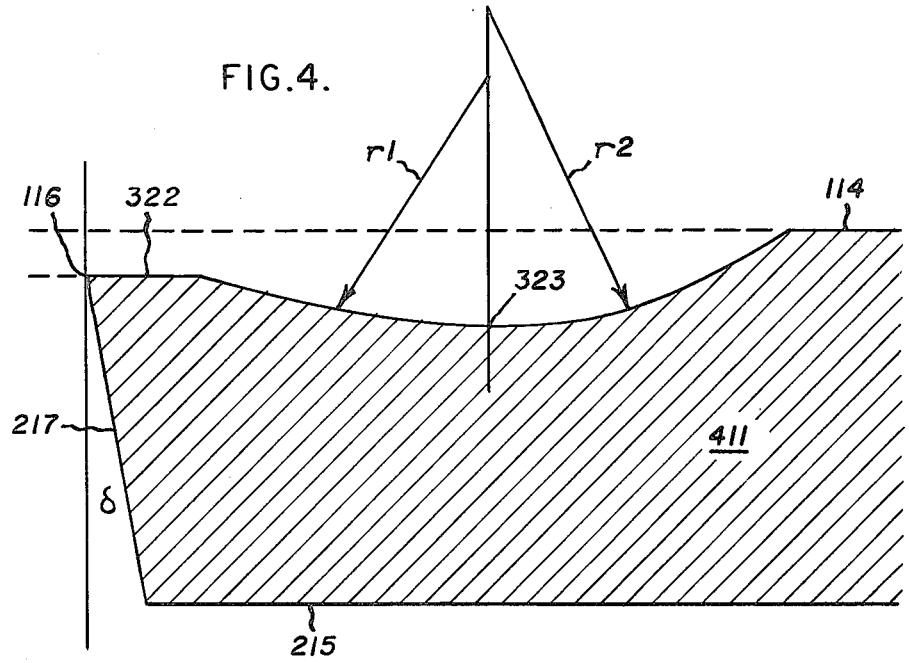
FIG. 4 is a cross-section of the insert taken along the line A—A in FIG. 3.

The general arrangement of the insert 111 of the present invention is shown in FIGS. 1 and 2. In plan view, it is a octagonally shaped insert having alternate obtuse angles 113 on a octagonal side face 114. As shown in FIGS. 2 and 4, the octagonal side face 114 has a parallel octagonal side face 215. The cutting edges 116 are formed at junctions of edge face 217 and octagonal side faces 114. In a positive raked insert the side faces 217 are raked δ degrees from the perpendicular to side face 114 to provide clearance during drilling. The value of δ may vary but is preferably 7°. The eight edge faces 217 join end to end to form the eight contiguous edge faces of the insert 111.

Each of the corners 113, 118 and 119 of the insert may be rounded to facilitate moulding of the insert and provide a stronger corner. However, at each junction the extension of adjacent side faces would meet in an obtuse angle. The geometry of the insert 111 may vary. In the embodiment shown in FIG. 3, the angle γ is 160°±30'. In use, the angle 113 may be presented to a workpiece such that the angles α and β are equal although α-β may vary. To be useful, such variation would generally be up to about 8°.

The geometry of the insert 111 may vary to provide four pairs of cutting edges. In the example shown in the drawings, the geometry is assymetrical when it is considered along the line of symmetry of the cutting edges, i.e. a notional line 320 dividing angle γ into two angles γ/2. In use such an insert 111 is reversible if it is a negative rake insert, or can be used in conjunction with a second insert, if it is a positive rake insert. As an example, the insert may have the following angles, angles 118 being 95°, angles 119 being 125° and angles 113 (i.e. γ) 160°. The tolerance of each angle may vary by ±30' for example.

Figure 3:
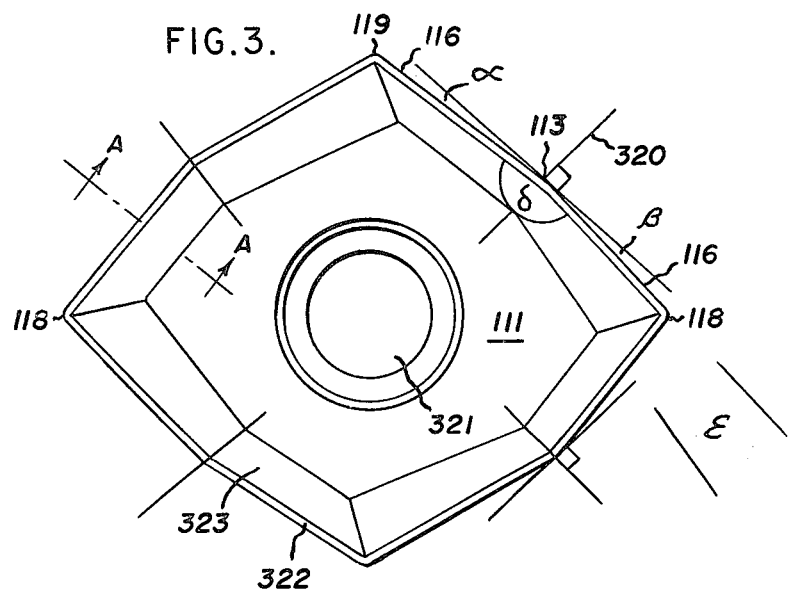
FIG. 3 is a plan view of an octagonal insert of the present invention showing the chip breaker arrangement.

The insert may be atttached to the machine tool i.e. the shank of a drill by any conventional means, such as insert clamps. As shown in FIGS. 2 and 3, the insert can be manufactured with a central hole 221, for attachment to a machine tool by conventional means such as a screw, lock pin, or clamp.

The insert may have conventional chip breakers in the form of grooves, dimples, recesses etc. in or on the surface of the insert which are generally moulded therein. FIG. 4 shows an insert 411 having a octagonal top face 114 and a hexagonal bottom face 215 with side face 217 raked by δ°, generally 7°, forming a cutting edge 116. Behind the cutting edge 116, is a peripheral land 322 which extends around the periphery of the insert as shown in FIGS. 1 and 3. This provides strength for the cutting edge 116. Peripheral land 322 is generally lower than the surface of the octagonal face 114. Behind the peripheral land 322 is a groove 323. The groove 323 is curved with a a double radius of curvature. The first part of the the groove 323 has a radius of curvature $\Phi^1$ which is less than radius $\Phi^2$ of the second part of the groove. The groove width may be uniform around the insert 111. In another embodiment, the groove behind alternate cutting edges 116 may taper outwardly in width from the notional line dividing the obtuse angle 113. This is shown in FIG. 3. The taper, ε, may vary but the width of the groove increases generally between 2° and 12°, preferably 5° from the parallel relative to the cutting edge 116. The angle ε is 5° as shown in FIG. 3. The advantage of a tapered chip groove of this type comes to the fore when the cutting edges are used in a rotational cutting apparatus such as a drill. The cutting forces on each of the cutting edges may differ due to the different radial speeds of each of the cutting edges 116. This is particularly the case when the axis of rotation of the insert is to one side of the notional line 320 dividing the obtuse angle 113.

Although an example of a chip breaking groove is shown in cross-section in FIG. 4, other chip breakers may also be used as has already been described above. Once again such chip breaking forms may be parallel to the cutting edge or be tapered. Both chip breakers may be tapered outwardly although, in width from the obtuse angle 113, it is preferred that each alternate groove only will be tapered in width outwardly from the obtuse angle 113. The taper will normally be applied to the chip breaker on the insert according to the final use of the insert. For example, some inserts may be used in right hand drill and will require the tapered chip breaker between angles 113 and 118 as shown in FIG. 3. If a an insert is required for a left hand drill the taper will be between angles 119 and 113.

The size or dimension of the insert may vary according to the usage. The insert can be manufactured from any material that conventional inserts are normally made from. Most inserts are sintered carbides which may or may not be coated with other materials such as alumina. However, ceramic inserts may also be used.

I claim:

1. An indexable disposable insert comprising eight contiguous edge faces and two octagonal side faces having four alternate corners with equal obtuse angles of a first value; two opposing corners with equal obtuse angles of a second value; and two opposing corners with equal obtuse angles of a third value greater than that of the second value; cutting edges being formed at the junction of at least one of the octagonal side faces and each of the eight contiguous edge faces.

2. An indexable insert, as claimed in claim 1, wherein the four equal alternate obtuse angles are within the range 135° to 170°.

3. An indexable insert, as claimed in claim 1, wherein the four equal alternate obtuse angles are within the range 150° to 165°.

4. An insert, as claimed in claim 1, wherein the four equal alternate obtuse angles are 160°±30', the two opposing obtuse angles of a third value are 125°±30', and the two opposing obtuse angles of a second value are 95°±30'.

5. An insert, as claimed in claims 1, 2, 3 or 4, having a chip breaker extending around at least one of the octagonal side faces behind the cutting edges.

6. An insert, as claimed in any one of claims 1, 2, 3, or 4 having a chip breaker behind each of the cutting edges on at least one of the octagonal side faces, the chip breaker behind alternate cutting edges being tapered such that it widens as it extends away from the obtuse angle.

7. An insert, as claimed in claims 1, 2, 3 or 4, having a chip breaker extending around at least one of the octagonal side faces behind the cutting edges wherein the chip breaker is a groove.

* * * * *